United States Patent
Wu et al.

(10) Patent No.: US 6,291,138 B1
(45) Date of Patent: Sep. 18, 2001

(54) MASKING FRAME PLATING METHOD FOR FORMING MASKING FRAME PLATED LAYER

(75) Inventors: Xuehua Wu, Union City; Yi-Chun Liu; Yining Hu, both of Fremont; Jei-Wei Chang, Cupertino; Kochan Ju, Fremont, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/360,121

(22) Filed: Jul. 23, 1999

(51) Int. Cl.$^7$ .................................................... G03C 5/00
(52) U.S. Cl. .......................................... 430/315; 430/313
(58) Field of Search ...................................... 430/314, 315

(56) References Cited

U.S. PATENT DOCUMENTS

| | | | |
|---|---|---|---|
| 4,424,271 | * 1/1984 | Keel et al. ............................ | 430/315 |
| 5,141,623 | * 8/1992 | Cohen et al. ......................... | 205/122 |
| 5,573,809 | * 11/1996 | Nix et al. ............................. | 427/123 |
| 5,652,687 | * 7/1997 | Chen et al. ........................... | 360/126 |
| 5,804,085 | * 9/1998 | Wu et al. .............................. | 216/22 |
| 5,843,521 | * 12/1998 | Ju et al. ............................... | 427/129 |
| 5,955,244 | * 9/1999 | Duval ................................... | 430/314 |
| 6,106,679 | * 8/2000 | Westwood ........................... | 204/192.32 |
| 6,141,183 | * 10/2000 | Wu et al. .............................. | 360/126 |

* cited by examiner

Primary Examiner—Janet Baxter
Assistant Examiner—Barbara Gilmore
(74) Attorney, Agent, or Firm—George O. Saile; Stephen B. Ackerman

(57) ABSTRACT

A method for forming a plated layer. There is first provided a substrate. There is then formed over the substrate a masking frame employed for masking frame plating a masking frame plated layer within the masking frame, where the masking frame is fabricated to provide an overhang of an upper portion of the masking frame spaced further from the substrate with respect to a lower portion of the masking frame spaced closer to the substrate. Finally, there is then plated the masking frame plated layer within the masking frame. The method is useful for forming masking frame plated magnetic pole tip stack layers with enhanced planarity dimensional control within magnetic transducer elements.

3 Claims, 3 Drawing Sheets

MASKING FRAME PLATING METHOD FOR FORMING MASKING FRAME PLATED LAYER

BACKGROUND OF THE INVENTION

1. Field of the Invention

The present invention relates generally to magnetic transducer elements employed within magnetic data storage and retrieval. More particularly, the present invention relates to plating methods for forming plated layers within magnetic transducer elements employed within magnetic data storage and retrieval.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically determined as areal storage density of a magnetic data storage medium formed upon a rotating magnetic data storage disk within a direct access storage device (DASD) magnetic data storage enclosure. The areal storage density of the magnetic data storage medium is defined largely by the track width, the track spacing and the linear magnetic domain density within the magnetic data storage medium. The track width, the track spacing and the linear magnetic domain density within the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium; and (3) the separation distance of the magnetic read-write head from the magnetic data storage medium.

While magnetic read-write heads are thus integral and essential within the art of magnetic data storage and retrieval, magnetic read-write heads are nonetheless not fabricated entirely without problems within the art of magnetic data storage and retrieval. In that regard, it is known in the art of magnetic data storage and retrieval that magnetic transducer elements within magnetic read-write heads, which magnetic transducer elements are typically required to be formed with uniform and controlled dimensions as areal recoding densities of magnetic data storage media increase, are often difficult to fabricate with such requisite levels of uniformity and dimensional control.

It is thus towards the goal of providing within magnetic read-write head fabrication methods through which may be formed within magnetic read-write heads magnetic transducer elements with enhanced uniformity and dimensional control that the present invention is directed.

Various magnetic transducer elements having desirable properties, and/or methods for fabrication thereof, have been disclosed within the art of magnetic read-write head fabrication.

For example, Chen et al., in U.S. Pat. No. 5,282,308, disclose a method for forming within a magnetic transducer element, with reduced process complexity and relaxed registration alignment tolerance requirements, a stitched upper magnetic pole layer comprising: (1) an upper magnetic pole tip layer having formed partially contacting and overlapping thereupon, and aligned thereto; (2) an upper magnetic pole yoke layer. The method realizes the foregoing objects by employing when forming the stitched upper magnetic pole layer a radiation hardened portion of a photoresist masking frame employed for forming the upper magnetic pole tip layer, where the radiation hardened portion of the photoresist masking frame provides a stitching pedestal at a location adjoining an overlap of the upper magnetic pole tip layer and the upper magnetic pole yoke layer.

In addition, Ju et al., in U.S. Pat. No. 5,285,340, discloses a magnetic transducer element wherein a lower magnetic pole tip layer and an upper magnetic pole tip layer which are sandwiched between and contacting, respectively, a corresponding lower magnetic pole yoke layer and a corresponding upper magnetic pole yoke layer within the magnetic transducer element are precisely aligned with an equivalent pole tip width, and where each of the lower magnetic pole tip layer and the upper magnetic pole tip layer has a thickness closely controlled. The magnetic transducer element employs when forming the upper pole tip layer separated from the lower pole tip layer by a gap filling layer within the magnetic transducer element a single photoresist masking frame in conjunction with a sequential photoresist masking frame plating method to provide a photoresist masking frame plated composite lower magnetic pole tip layer/gap filling layer/upper magnetic pole tip layer fully areally aligned.

Further, Chen et al., in U.S. Pat. No. 5,652,687, discloses a magnetic transducer element which is formed with a narrow and well defined magnetic pole tip layer width, and thus also a narrow and well defined trackwidth of the magnetic transducer element, and wherein there is also avoided magnetic saturation of the magnetic transducer element. To realize the foregoing objects, there is employed when forming the magnetic transducer element a "U" shaped notch formed into a non-magnetic layer formed interposed between a lower magnetic pole yoke layer and an upper magnetic pole yoke layer within the magnetic transducer element, and wherein there is formed into the "U" shaped notch at least one magnetic pole tip layer within the magnetic transducer element.

Still further, Ju et al., in U.S. Pat. No. 5,843,521, discloses a photoresist masking frame plating method for forming a photoresist masking frame plated magnetic pole layer within a magnetic transducer element, where: (1) the photoresist masking frame plated magnetic pole layer is a photoresist masking frame plated notched magnetic pole layer having a notch formed therein at a juncture with a seed layer employed within the photoresist masking frame plating method since a photoresist masking frame employed within the photoresist masking frame plating method has a foot formed therein at the juncture with the seed layer; and (2) there is avoided when electromagnetically energizing a magnetic write head having formed therein the magnetic transducer element a magnetic write field gradient boundary decompression incident to forming the photoresist masking frame plated notched magnetic pole layer through the photoresist frame plating method. The method realizes the foregoing object by employing when forming the photoresist frame plated notched magnetic pole layer the seed layer formed of a thickness and of a material which compensates when electromagnetically energizing the magnetic write head for the magnetic write field gradient boundary decompression between the photoresist masking frame plated notched magnetic pole layer and a second magnetic pole layer.

Finally, Feng et al., in U.S. Pat. No. 5,878,481, discloses a magnetic pole layer trimming method for forming within a magnetic transducer element a lower magnetic pole tip within a lower magnetic pole layer separated from an upper magnetic pole tip within an upper magnetic pole layer by a gap filling dielectric layer, with minimal consumption of the upper magnetic pole tip, wherein: (1) the lower magnetic pole layer and the upper magnetic pole layer are formed of a permalloy magnetic material; and (2) the gap filling dielectric layer is formed of an aluminum oxide dielectric material. The method realizes the foregoing object by employing when forming the lower magnetic pole tip within the lower magnetic pole layer while employing the upper magnetic pole tip within the upper magnetic pole layer as a mask a reactive ion beam etch (RIBE) method employing a carbon tetrafluoride etchant gas.

Desirable within the art of magnetic head fabrication and magnetic transducer element fabrication are additional methods and materials through which there may be formed within magnetic transducer elements layers with enhanced uniformity and dimensional control.

It is towards the foregoing object that the present invention is directed.

SUMMARY OF THE INVENTION

A first object of the present invention is to provide a method for forming a layer within a magnetic transducer element.

A second object of the present invention is to provide a method in accord with the first object of the present invention, wherein the layer is formed with enhanced uniformity and dimensional control.

A third object of the present invention is to provide a method in accord with the first object of the present invention and the second object of the present invention, which method is readily commercially implemented.

In accord with the present invention, there is provided by the present invention a method for forming a plated layer. To practice the method of the present invention, there is first provided a substrate. There is then formed over the substrate a masking frame employed within a masking frame plating method for masking frame plating a masking frame plated layer within the masking frame, where the masking frame is fabricated to provide an overhang of an upper portion of the masking frame spaced further from the substrate with respect to a lower portion of the masking frame spaced closer to the substrate. Finally, there is then plated the masking frame plated layer within the masking frame.

The present invention provides a method for forming a layer within a magnetic transducer element, wherein the layer is formed with enhanced uniformity and dimensional control. As will be illustrated within the Description of the Preferred Embodiment which follows, the present invention realizes the foregoing object by employing when forming a plated layer within a magnetic transducer element a masking frame plating method where a masking frame within the masking frame plating method is fabricated to provide an overhang of an upper portion of the masking frame spaced further from the substrate over which is formed a masking frame plated layer while employing the masking frame with respect to a lower portion of the masking frame spaced closer to the substrate.

The method of the present invention is readily commercially implemented. The present invention employs methods and materials as are generally conventional in the art of magnetic sensor element fabrication within magnetic head fabrication, but the specific limitations of which provide novelty to the present invention. Since it is thus a novel ordering and use of methods and materials which at least in part provides the present invention, rather than the existence of methods and materials which provides the present invention, the method of the present invention is readily commercially implemented.

BRIEF DESCRIPTION OF THE DRAWING

The objects, features and advantages of the present invention are understood within the context of the Description of the Preferred Embodiment, as set forth below. The Description of the Preferred Embodiment is understood within the context of the accompanying drawings, which forms a material part of this disclosure, wherein.

DESCRIPTION OF THE PREFERRED EMBODIMENT

The present invention provides a method for forming a layer within a magnetic transducer element, wherein the layer is formed with enhanced uniformity and dimensional control. The present invention realizes the foregoing object by employing when forming a plated layer within a magnetic transducer element a masking frame plating method where a masking frame within the masking frame plating method is fabricated to provide an overhang of an upper portion of the masking frame spaced further from the substrate over which is formed a masking frame plated layer while employing the masking frame with respect to a lower portion of the masking frame spaced closer to the substrate.

Although the preferred embodiment of the present invention illustrates the present invention within the context of forming a masking frame plated composite magnetic pole tip stack layer comprising a masking frame plated lower magnetic pole tip layer having plated thereupon a masking frame plated gap filling layer in turn having plated thereupon a masking frame plated upper magnetic pole tip layer, where for reasons as disclosed below the masking frame plated magnetic pole tip stack layer provides particular value within a magnetic transducer element in accord with the present invention, the method of the present invention may be employed for forming masking frame plated layers including but not limited to masking frame plated magnetic layers and masking frame plated non-magnetic layers within magnetic transducer elements including but not limited to inductive magnetic read transducer elements, inductive magnetic write magnetic transducer elements, inductive magnetic read-write magnetic transducer elements, merged inductive magnetic write magnetoresistive (MR) read magnetic transducer elements, and non-merged inductive magnetic write magnetoresistive (MR) read magnetic transducer elements, which may be employed within corresponding magnetic heads within magnetic data storage and transduction applications including but not limited to digital magnetic data storage and transduction applications and analog magnetic data storage and transduction applications while employing magnetic data storage enclosures including but not limited to direct access storage device (DASD) magnetic data storage enclosures and linear access storage device (LASD) magnetic data storage enclosures.

Figure 1:
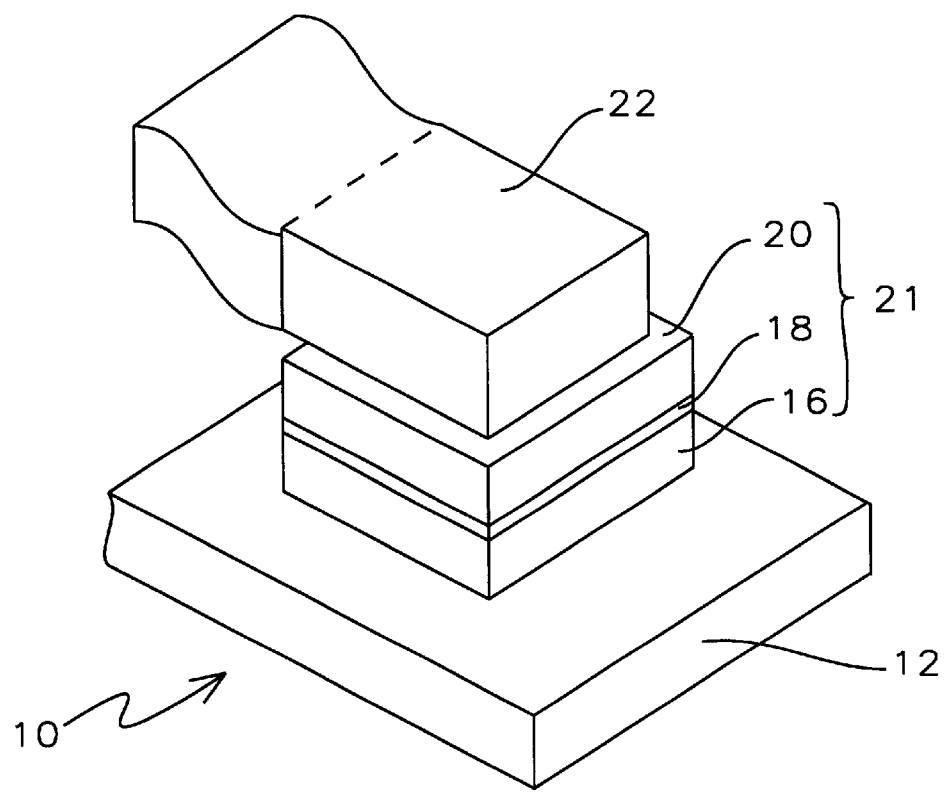
FIG. 1 shows a schematic perspective view diagram illustrating a magnetic transducer element which may be formed, in part, while employing the method of the present invention.

Referring now to FIG. 1, there is shown a schematic perspective view diagram of a magnetic transducer element which may be fabricated, in part, while employing the present invention.

Shown in FIG. 1 is a magnetic transducer element 10 which comprises a lower magnetic pole yoke 12 which is separated from an upper magnetic pole yoke layer 22 by a magnetic pole tip stack layer 21 which in turn contacts both the upper magnetic pole yoke layer 22 and the lower magnetic pole yoke layer 12. The magnetic pole tip stack layer 21 in turn comprises a lower magnetic pole tip layer 16 having formed areally coextensive thereupon a gap filling layer 18 in turn having formed areally coextensive thereupon an upper magnetic pole tip layer 20. Although not specifically illustrated within the schematic perspective view diagram of FIG. 1, the magnetic transducer element 10 is typically formed upon or over a substrate.

The magnetic transducer element 10 as illustrated within FIG. 1 has previously been generally disclosed within Ju et al., in U.S. Pat. No. 5,285,340, as cited within the Description of the Related Art, the teachings of all of which related art are incorporated herein fully by reference. As is disclosed within Ju et al. as cited above, the magnetic pole tip stack layer 21 may be formed employing a masking frame plating method which is more specifically disclosed as a photoresist masking frame plating method.

While the photoresist masking frame plating method as more specifically disclosed within Ju et al., as cited above, may in fact be employed for forming a magnetic pole tip stack layer generally similar to the magnetic pole tip stack layer 21 as illustrated within the schematic perspective view diagram of FIG. 1, incident to the present invention it has been observed that a magnetic pole tip stack layer analogous or equivalent to the magnetic pole tip stack layer 21 as illustrated within the schematic perspective view diagram of FIG. 1 is not formed entirely without difficulties within the art of magnetic transducer element fabrication.

Figure 2:
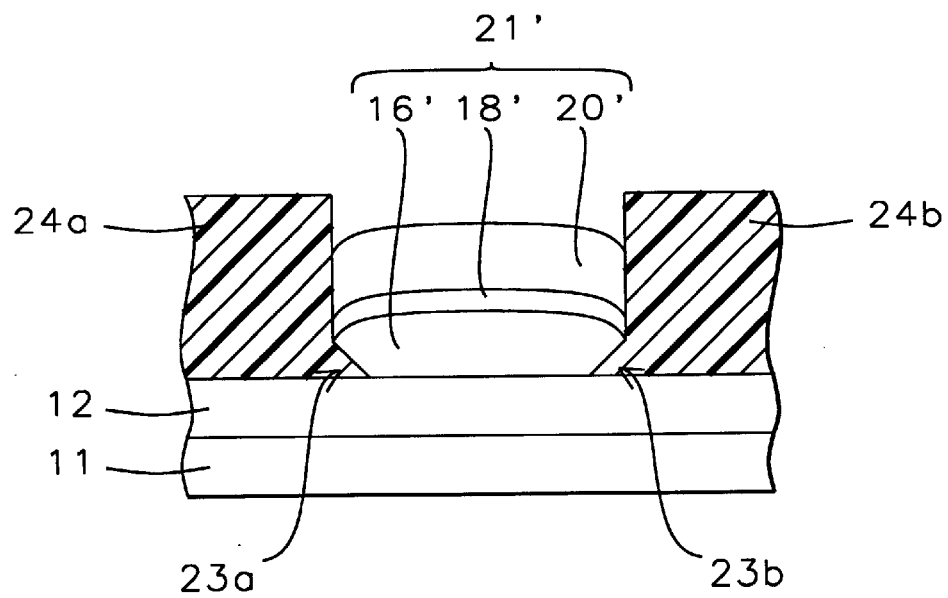
FIG. 2 shows a schematic cross-sectional diagram of a photoresist masking frame plated patterned magnetic pole tip stack layer plated within a photoresist masking frame not in accord with the present invention.

In particular, it has been discovered experimentally and confirmed theoretically incident to the present invention that rather than providing a series of fully aligned and fully parallel layers within a magnetic pole tip stack layer analogous or equivalent to the magnetic pole tip stack layer 21 whose schematic perspective view diagram is illustrated in FIG. 1, a magnetic pole tip stack layer formed in accord with a masking frame plating method as is disclosed for forming the magnetic pole tip stack layer 21 whose schematic perspective view diagram is illustrated in FIG. 1 is rather more likely to be formed absent full areal alignment and full parallel disposition of the layers formed therein, as illustrated more specifically within the schematic cross sectional diagram of FIG. 2.

Shown in FIG. 2 is a schematic cross-sectional diagram of a magnetic pole tip stack layer 21' generally analogous to the magnetic pole tip stack layer 21 as illustrated within the schematic perspective view diagram of FIG. 1, but wherein in addition to the magnetic pole tip stack layer 21' and an otherwise equivalent lower magnetic pole yoke layer 12 there is illustrated: (1) a substrate 11 over which is formed the lower magnetic pole yoke layer 12; and (2) a pair of patterned photoresist masking frame layers 24a and 24b which form, in part, a photoresist masking frame which is employed within a photoresist masking frame plating method when forming while employing the photoresist masking frame plating method the magnetic pole tip stack layer 21' which in turn comprises: (1) a lower magnetic pole tip layer 16', having formed thereupon; (2) a gap filling layer 18', in turn having formed thereupon; (3) an upper magnetic pole tip layer 20'.

As is illustrated within the schematic cross-sectional diagram of FIG. 2, each of the patterned photoresist masking frame layers 24a and 24b has formed therein a corresponding foot 23a or 23b which intrudes into a region upon the lower magnetic pole yoke layer 12 upon which it is desired to form the lower magnetic pole tip layer 16' within magnetic pole tip stack layer 21'. The presence of such a foot within a patterned photoresist masking frame layer which may be employed within a photoresist masking frame plating method for forming a photoresist masking frame plated magnetic pole layer within a magnetic transducer element is otherwise generally known in the art of magnetic transducer element fabrication, as is illustrated, for example and without limitation, within Ju et al., U.S. Pat. No. 5,843,521, as cited within the Description of the Related Art, the teachings of all of which related art are, as noted above, incorporated herein fully by reference.

It has also been determined experimentally, as is clearly illustrated within the schematic cross-sectional diagram of FIG. 2, that the presence of the pair of feet 23a and 23b within the corresponding pair of patterned photoresist masking frame layers 24a and 24b will typically provide, particularly under circumstances where it is desired to form the patterned magnetic pole tip stack layer 21' with particularly limited linewidth (i.e. less than about 1.5 microns), that each of the lower magnetic pole tip layer 16', the gap filling layer 18' and the upper magnetic pole tip layer 20' is formed with a surface curvature or an interfacial curvature when each of the lower magnetic pole tip layer 16', the gap filling layer 18' and the upper magnetic pole tip layer 20' is sequentially plated while employing a photoresist masking frame plating method into the aperture defined by the pair of patterned photoresist masking frame layers 24a and 24b. Such a surface curvature or an interfacial curvature of each of the lower magnetic pole tip layer 16', the gap filling layer 18' and the upper magnetic pole tip layer 20' is undesirable within the art of magnetic transducer element fabrication since such surface curvature and interfacial curvature generally compromises an optimally increased areal density within a magnetic recording medium within which magnetic data is recorded while employing a magnetic head having fabricated therein the magnetic transducer element.

Figure 3:
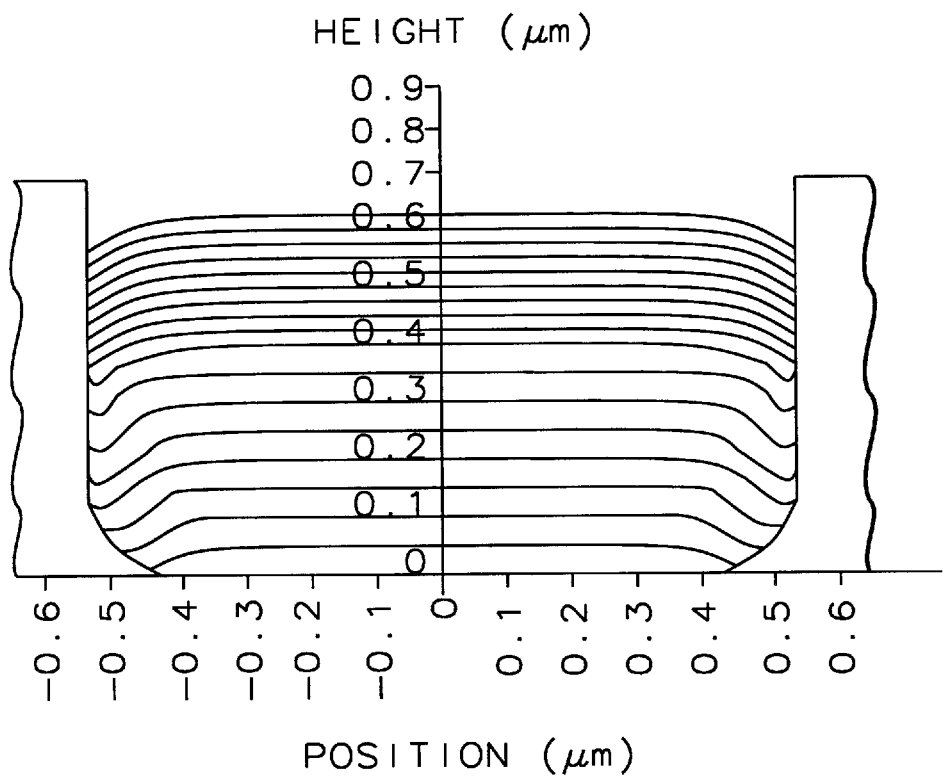
FIG. 3 is a graph resulting from a computer simulation of plating dimensions and uniformity performance for the photoresist masking frame plated patterned magnetic pole tip stack layer plated within the photoresist masking frame in accord with the schematic cross-sectional diagram of FIG. 2.

Referring now to FIG. 3, there is shown a graph of a computer simulation of plating dimensions and uniformity performance correlating with a photoresist frame plated patterned magnetic pole tip stack layer plated within the photoresist masking frame in accord with the schematic cross-sectional diagram of FIG. 2. Within FIG. 3, the computer simulation employed a pair of masking frame layers defining in part an aperture width of about 1.0 micron, where each masking frame layer has extending therefrom a smoothly tapered foot extending into the aperture to a distance of about 0.1 microns. As is illustrated within the graph of the computer simulation as illustrated within FIG. 3, a photoresist masking frame plated layer exhibits a surface non-planarity or an interfacial non-planarity theoretically expected within the context of the magnetic pole tip stack layer 21' as illustrated within the schematic cross-sectional diagram of FIG. 2.

Figure 4:
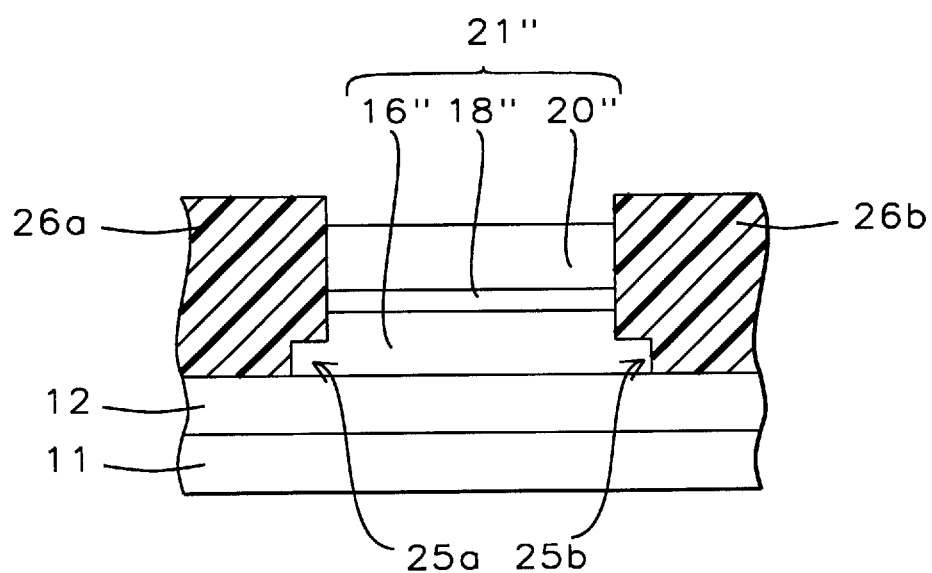
FIG. 4 shows a schematic cross-sectional diagram of a photoresist masking frame plated patterned magnetic pole tip stack layer plated within a photoresist masking frame in accord with the present invention.

Referring now to FIG. 4, there is shown a schematic cross-sectional diagram of a masking frame plated magnetic pole tip stack layer formed in accord with a preferred embodiment of the present invention.

Shown in FIG. 4, in a first instance, and analogously with that which is shown in FIG. 2, is a substrate 11, over which substrate 11 is formed a magnetic pole tip stack layer 21" while employing a pair of patterned masking frame layers 26a and 26b in accord with the present invention. Analogously with the magnetic pole tip stack layer 21' as illustrated within the schematic cross-sectional diagram of FIG. 2 and the magnetic pole tip stack layer 21 as illustrated within the schematic perspective view diagram of FIG. 1, the magnetic pole tip stack layer 21" as illustrated within the schematic cross-sectional diagram of FIG. 4 comprises a lower magnetic pole tip layer 16" having formed thereupon a gap filling layer 18" in turn having formed thereupon an upper magnetic pole tip layer 20".

Within the preferred embodiment of the present invention with respect to the substrate 11, although it is known in the art of magnetic transducer element fabrication that substrates may be formed of non-magnetic ceramic materials selected from the group including but not limited to oxides, nitrides, borides, carbides, and homogeneous or heterogeneous aggregates or laminates of oxides, nitrides, borides and carbides, for the preferred embodiment of the present invention, the substrate 11 is typically and preferably formed of an alumina-titanium carbide non-magnetic ceramic material. Typically and preferably, the substrate 11 is formed of sufficient dimensions such that the substrate 11 may be fabricated into a slider employed within a magnetic transducer element employed within a magnetic head employed within a direct access storage device (DASD) magnetic data storage enclosure employed within digitally encoded magnetic data storage and retrieval, although, as suggested above, a magnetic transducer element fabricated in accord with the present invention may be employed within a magnetic head employed within magnetic data storage and transduction applications including but not limited to analog magnetic data storage and transduction applications and digital magnetic data storage and transduction applications while employing magnetic data storage enclosures including but not limited to direct access storage device (DASD) magnetic data storage enclosures and linear access storage device (LASD) magnetic data storage enclosures.

Although also not specifically illustrated within the schematic cross-sectional diagram of FIG. 4, the substrate 10 may be a substrate alone as employed within a magnetic transducer element, or in the alternative, the substrate 10 may comprise the substrate as employed in forming the magnetic transducer element, where the substrate has formed thereupon and or thereover, and thus incorporated therein, any of several additional layers as are commonly employed in forming a magnetic head while employing the substrate. Such additional layers may include, but are not limited to undercoating layers, additional magnetic pole layers, shield layers and related layers directed towards incorporation of a magnetoresistive (MR) sensor element into a magnetic head formed employing the magnetic transducer element whose schematic cross-sectional diagram is illustrated in FIG. 4.

Also shown in FIG. 4 is the pair of patterned masking frame layers 26a and 26b which is distinguishable from the pair of patterned photoresist masking frame layers 24a and 24b whose schematic cross-sectional diagrams are illustrated within FIG. 2 by virtue of a pair of notches 25a and 25b which undercut a lower portion of each patterned masking frame layer 26a or 26b closer to the substrate 11 and adjoining the lower magnetic pole yoke layer 12 in comparison with an upper portion of each patterned masking frame layer 26a and 26b further from the substrate 11 and the lower magnetic pole yoke layer 12.

As is similarly illustrated within the schematic cross-sectional diagram of FIG. 4, the pair of notches 25a and 25b provides when subsequently forming while employing a frame plating method while employing the pair of patterned masking frame layers 26a and 26b the magnetic pole tip stack layer 21" comprising the lower magnetic pole tip layer 16", the gap filling layer 18" and the upper magnetic pole tip layer 20" each of the lower magnetic pole tip layer 16", the gap filling layer 18' and the upper magnetic pole tip layer 20" with enhanced uniformity and dimensional control, in particular planarity dimensional control.

Within the preferred embodiment of the present invention, each of the lower magnetic pole yoke layer 12, the lower magnetic pole tip layer 16", the upper magnetic pole tip layer 20" and an upper magnetic pole yoke layer which is not illustrated within the schematic cross-sectional diagram of FIG. 4 (but otherwise corresponds with the upper magnetic pole yoke layer 22 within the magnetic transducer element whose schematic perspective view diagram is illustrated in FIG. 1), may be formed employing soft magnetic materials as are either conventional or non-conventional in the art of magnetic transducer element fabrication, such soft magnetic materials including but not limited to nickel-iron alloy soft magnetic materials, nickel-iron-cobalt alloy soft magnetic materials, cobalt-iron soft magnetic materials, other iron alloy soft magnetic materials and higher order alloys incorporating the foregoing soft magnetic materials. Most typically and preferably the lower magnetic pole yoke layer 12, the lower magnetic pole tip layer 16", the upper magnetic pole tip layer 20" and the upper magnetic pole yoke layer not otherwise illustrated within the schematic cross-sectional diagram of FIG. 4 are formed employing a nickel-iron alloy (45:55, w:w) permalloy alloy plated employing plating solution compositions as are otherwise conventional in the art of magnetic transducer element fabrication, which plating solutions may or may not include a leveling agent. Typically and preferably, the lower magnetic pole yoke layer 12 is formed to a thickness of from about 2000 to about 60000 angstroms, the lower magnetic pole tip layer 16" is formed to a thickness of from about 500 to about 8000 angstroms, the upper magnetic pole tip layer 20" is formed to a thickness of from about 6000 to about 50000 angstroms and the not otherwise illustrated upper magnetic pole yoke layer is formed to a thickness of from about 10000 to about 50000 angstroms.

Similarly, as is understood by a person skilled in the art, the gap filling layer 18', in order for the magnetic pole tip layer stack 21" to be contiguously plated, must typically be formed employing a plateable non-magnetic conductor material. Such plateable non-magnetic conductor materials, which similarly may be formed of non-magnetic conductor materials which are either conventional in the art of magnetic transducer element fabrication or non-conventional in the art of magnetic transducer element fabrication, may include but are not limited to gold, gold alloys, copper, nickel-copper alloys, other copper alloys, nickel-cadmium alloys, nickel-tin alloys, nickel-platinum alloys, nickel-palladium alloys, nickel-chromium alloys, non magnetic iron alloys, non magnetic cobalt alloys and higher order non-magnetic alloys thereof. Typically and preferably, the gap filling layer 18" is formed to a thickness of from about 1000 to about 4000 angstroms.

While there is illustrated within the schematic cross-sectional diagram of FIG. 4 the pair of patterned masking frame layers 26a and 26b as nominally patterned photoresist layers, for the present invention, the pair of patterned masking frame layers 26a and 26b may be formed from any of several masking materials, or composites thereof, which may be employed for forming masking frame layers within magnetic transducer element fabrication, provided that there is formed when forming the pair of patterned masking frame layers 26a and 26b an appropriately sized pair of notches analogous or equivalent to the pair of notches 25a and 25b as illustrated within the schematic cross-sectional diagram of FIG. 4. Thus, the pair of patterned masking frame layers 26a and 26b may be formed of masking materials including but not limited to inorganic masking materials and organic masking materials, as well as composites thereof and laminates thereof.

Similarly, although the preferred embodiment of the present invention illustrates the present invention within the context of forming the pair of patterned masking frame layers 26a and 26b with the pair of notches 25a and 25b which are rectangular notches, within the present invention the pair of notches 25a and 25b need not necessarily be a pair of rectangular notches but in the alternative may also be a pair of notches or recesses of curved shape while still providing the desired advantage of the present invention, which advantage is to provide within a magnetic pole tip stack layer a series of layers each of which is formed with enhanced uniformity and dimensional control, in particular planarity dimensional control, such that there is realized optimal read and/or write performance of a magnetic head having formed therein a magnetic transducer element analogous or equivalent to the magnetic transducer element whose schematic cross-sectional diagram is illustrated in FIG. 4.

Notwithstanding the breadth of materials and structural dimensions which may be employed for forming a pair of patterned masking frame layers in accord with the present invention, for the preferred embodiment of the present invention, each of the pair of patterned masking frame layers 26a and 26b is preferably formed of a bilayer comprised of an underlayer of a first pre-irradiated poly(di)methlyglarimide (PMGI) positive photoresist material layer having formed thereupon a second positive photoresist material layer. The second positive photoresist layer is then exposed and developed to provide an aperture of dimensions about 0.3 to about 2.5 microns which leaves exposed a portion of the lower magnetic pole yoke layer 12 while simultaneously undercutting beneath the second positive photoresist material layer to form an annular notch thereunder. Preferably the annular notch is of width from about 0.1 to about 1.5 microns, which is effected while employing a pre-baking temperature and a pre-baking time when forming the first pre-irradiated poly(di)methlyglarimide positive photoresist material layer, in conjunction with a developer concentration and a developer exposure time employed for developing the second positive photoresist material layer. Similarly, the notch height is preferably from about 200 to about 3000 angstroms, which is determined by a thickness of the first pre-irradiated poly(di)methlyglarimide positive photoresist material layer.

Figure 5:
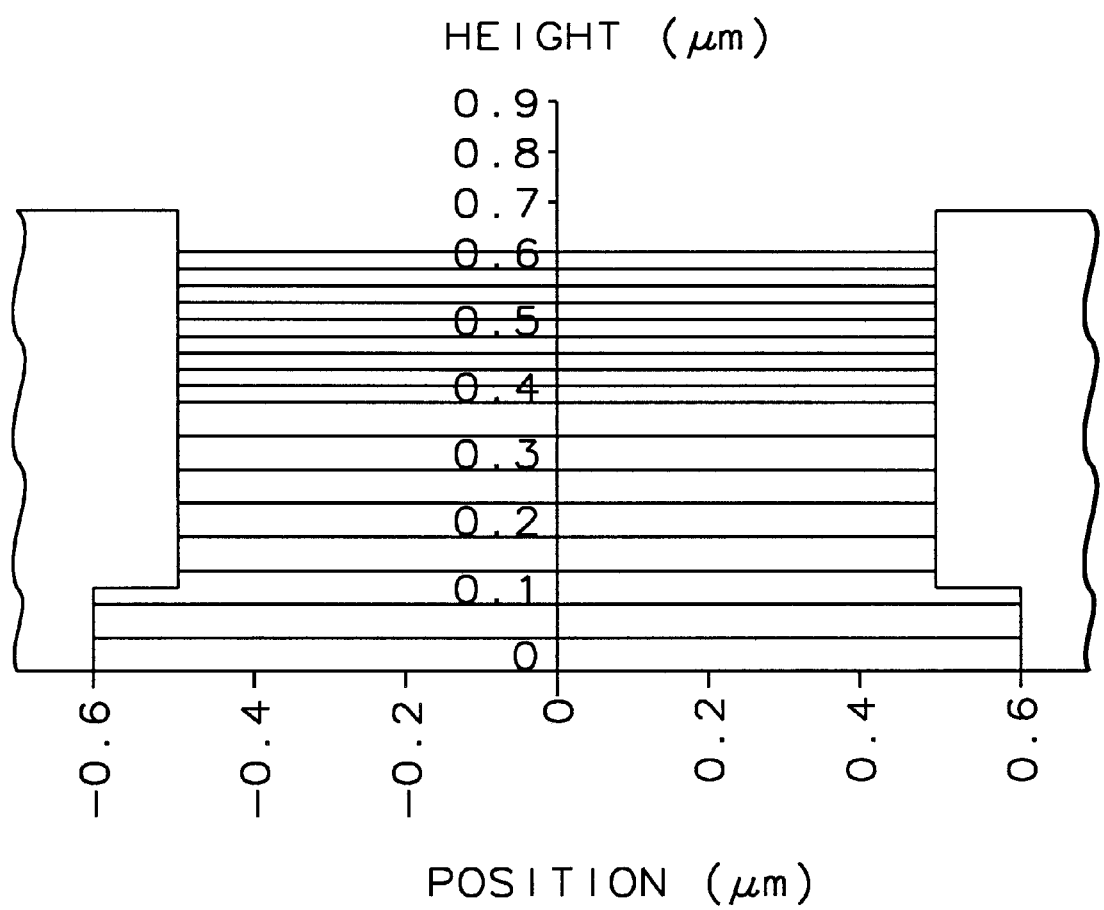
FIG. 5 is a graph resulting from a computer simulation of plating dimensions and uniformity performance for the photoresist masking frame plated patterned magnetic pole tip stack layer plated within the photoresist masking frame in accord with the schematic cross-sectional diagram of FIG. 4.

Referring now to FIG. 5, there is shown a graph of a computer simulation of plating dimensions and uniformity performance correlating with a masking frame plated patterned magnetic pole tip stack layer plated within a masking frame in accord with the schematic cross-sectional diagram of FIG. 4. As is illustrated within the graph of the computer simulation whose graph is illustrated in FIG. 5, a plated layer or a series of plated layers formed within an aperture defined by a pair of patterned masking frame layers having a pair of notches formed therein is, consistent with that which is illustrated within the schematic cross-sectional diagram of FIG. 4, formed with enhanced uniformity and dimensional control, in particular surface and interface dimensional planarity, in comparison with a plated layer or a series of plated layers as illustrated within the graph of FIG. 3.

Upon forming the magnetic pole tip stack layer whose schematic cross-sectional diagram is illustrated in FIG. 4, there is formed a magnetic pole tip stack layer with enhanced uniformity and dimensional control, and in particular enhanced surface and interfacial planarity dimensional control in comparison with magnetic pole tip stack layers as are formed employing masking frame plating methods as are conventional in the art of magnetic transducer element fabrication. This result is realized insofar as the magnetic pole tip stack layer formed in accord with the present invention is formed employing a masking frame plating method employing a masking frame having formed therein a notch instead of a foot, as is more commonly formed within a masking frame employed when masking frame plating a magnetic pole tip stack layer.

As is understood by a person skilled in the art, the magnetic transducer element whose schematic cross-sectional diagram is illustrated in FIG. 4 may be further fabricated, at minimum, to form therein an upper magnetic pole yoke layer 22 as illustrated within the schematic perspective view diagram of FIG. 1, to thus form a magnetic transducer element analogous to the magnetic transducer element 10 whose schematic perspective view diagram is illustrated in FIG. 1. Similarly, as suggested above, there may be also be formed within the magnetic transducer element whose schematic cross-sectional diagram is illustrated within FIG. 4 additional layers and structures are common within a magnetic head within which is formed the magnetic transducer element whose schematic cross-sectional diagram is illustrated within FIG. 4. Such additional layers and structures may include, but are not limited to additional pole layers and structures, shield layers and structures, magnetoresistive (MR) and related layers and structures, conductor layers and structures, interconnection layers and structures, and various dielectric passivation layers and structures. While employing these additional layers and structures there may be formed while employing the present invention magnetic heads including but not limited to inductive magnetic read heads, inductive magnetic write heads, inductive magnetic read-write heads, merged inductive magnetic write magnetoresistive (MR) read heads and non merged inductive magnetic write magnetoresistive (MR) read heads.

Similarly, and again in concert with that which is disclosed above, although the preferred embodiment of the present invention illustrates a magnetic pole tip stack layer formed employing the method of the present invention, the present invention may alternatively be employed for forming within magnetic transducer elements plated layers other than magnetic pole tip stack layers, such other plated layers may include, but are not limited to plated magnetic layers and plated non-magnetic layers including but not limited to magnetic pole layers other than magnetic pole tip layers, magnetic shield layers, conductor layers, conductor interconnect layers and conductor spacer layers.

Finally, as is understood by a person skilled in the art, the preferred embodiment of the present invention is illustrative of the present invention rather than limiting of the present invention. Revisions and modifications may be made to methods, materials, structures and dimensions through which is formed a plated layer, such as a magnetic pole tip stack layer, in accord with the preferred embodiment of the present invention while still providing a plated layer in accord with the present invention, in accord with the appended claims.

What is claimed is:

1. A method for forming a magnetic pole tip stack layer wherein each layer of said stack has enhanced planarity, uniformity and dimensional control comprising:

providing a substrate;

forming over the substrate a masking frame employed for masking frame plating a masking frame plated magnetic pole tip stack layer within the masking frame, where the masking frame is fabricated to provide an overhang of an upper portion of the masking frame spaced further from the substrate with respect to a lower portion of the masking frame spaced closer to the substrate, and plating the masking frame plated magnetic pole tip stack layer within the masking frame.

2. The method of claim 1 wherein the masking frame is formed from masking materials selected from the group consisting of inorganic masking materials, organic masking materials, composites of inorganic masking materials and organic masking materials, and laminates of inorganic masking materials and organic masking materials.

3. The method of claim 1 wherein the masking frame plated magnetic pole tip layer is formed from at least one of a lower magnetic pole tip layer and an upper magnetic pole tip layer laminated to a non-magnetic gap filling layer wherein:

the at least one of the lower magnetic pole tip layer and the upper magnetic pole tip layer is formed from a soft magnetic material selected from the group consisting of nickel-iron alloys, nickel-iron-cobalt alloys, cobalt-iron alloys, other soft iron containing materials, and higher order alloys thereof; and the non-magnetic gap filling layer is selected from the group consisting of gold, gold alloys, copper, nickel copper alloys, other copper alloys, nickel-cadmium alloys, nickel-tin alloys, nickel-platinum alloys, nickel-palladium alloys, nickel-chromium alloys, non-magnetic iron alloys, non-magnetic cobalt alloys and higher order alloys thereof.

\* \* \* \* \*